United States Patent
Portilla

(10) Patent No.: US 8,577,888 B2
(45) Date of Patent: Nov. 5, 2013

(54) TAGGING EMAIL AND PROVIDING TAG CLOUDS FIELD OF THE INVENTION

(75) Inventor: Jesus Ivan Portilla, Erie, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/157,959

(22) Filed: Jun. 10, 2011

(65) Prior Publication Data

US 2011/0270937 A1 Nov. 3, 2011

Related U.S. Application Data

(63) Continuation of application No. 12/186,111, filed on Aug. 5, 2008, now abandoned.

(51) Int. Cl.
*G06F 7/00* (2006.01)
*G06F 17/30* (2006.01)

(52) U.S. Cl.
USPC .......................................... 707/738; 707/740

(58) Field of Classification Search
USPC ................................................ 707/738, 740
See application file for complete search history.

(56) References Cited

U.S. PATENT DOCUMENTS

| | | |
|---|---|---|
| 6,185,551 B1 | 2/2001 | Birrell et al. |
| 6,917,965 B2 | 7/2005 | Gupta et al. |
| 7,747,705 B1 * | 6/2010 | Raja .............................. 709/219 |
| 2002/0055955 A1 | 5/2002 | Lloyd-Jones et al. |
| 2006/0036696 A1 | 2/2006 | Maresh |
| 2007/0143298 A1 * | 6/2007 | Surendran et al. .............. 707/10 |
| 2008/0235289 A1 | 9/2008 | Carnes et al. |
| 2009/0077124 A1 | 3/2009 | Spivack et al. |
| 2009/0119370 A1 * | 5/2009 | Stern et al. .................... 709/206 |
| 2010/0036856 A1 | 2/2010 | Portilla |

OTHER PUBLICATIONS

Lopez, Eddie; "A Brighter Outlook: Part I- Email Tagging", Apr. 28, 2006; http://my.opera.com/usability/blog/show.dml/237595.

John et al.; "Collaborative Tagging and Expertise in the Enterprise" WWW 2006, May 22-26, 2006, Edinburgh, UK, pp. 1-6; http://www.semanticmetadata.net/hosted/taggingws-www2006-files/26.pdf.

Cutrell et al; "Fast, Flexible Filtering with Plat- Personal Search and Organization Made Easy", CHI 2006: Conference on Human Factors in Computing Systems, Apr. 22-27, 2006, Montreal, QC, Canada; Apr. 2006.

Moroney et al; "Automatic Creation of File Meta-Data", Research Disclosure, n 511, Nov. 2006, p. 1461.

Non-final office action dated Dec. 7, 2010 for U.S. Appl. No. 12/186,111.

Portilla, "Tagging Email and Providing Tag Clouds," USPTO U.S. Appl. No. 13/930,714 and Preliminary Amendment, filing date Jun. 28, 2013, 47 pages.

* cited by examiner

*Primary Examiner* — Mariela Reyes
(74) *Attorney, Agent, or Firm* — Yee & Associates, P.C.; Arthur J. Samodovitz

(57) ABSTRACT

A system and method is provided for tracking and/or organizing email and, in particular, a system and method for tagging email in Web 2.0 applications and using the tags in tag clouds is provided. The system includes a computing system that has first program instructions to generate tag clouds having tags linked to associated emails in a collaborative application. A computer readable media stores the first program instructions and a central processing unit executes the first program instructions.

20 Claims, 7 Drawing Sheets

US 8,577,888 B2

TAGGING EMAIL AND PROVIDING TAG CLOUDS FIELD OF THE INVENTION

CROSS REFERENCE TO RELATED APPLICATION

This is application is a continuation application of pending U.S. patent application Ser. No. 12/186,111 and now U.S. Published Patent Application No. 2010-0036856A1 filed Aug. 5, 2008, now abandoned.

FIELD OF THE INVENTION

The invention generally relates to a system and method of tracking and/or organizing email and, in particular, a system and method for tagging email in Web 2.0 applications and using the tags in tag clouds.

BACKGROUND

Electronic mail, e.g., e-mail, is a store-and-forward method of writing, sending, receiving and saving messages that has become ubiquitous in today's society, used for both personal and business applications. Email is a system based on the Simple Mail Transfer Protocol (SMTP) that can be used in a distributed computing environment over many different platforms and network systems. For example, email can be useful and is applicable to various mainframe, minicomputer or intranet systems allowing users within one organization to send messages to each other in support of workgroup collaboration. Intranet systems may be based on proprietary protocols supported by a particular system vendor, or on the same protocols used on public networks.

Messages are exchanged between hosts using the SMTP using software programs called mail transfer agents (MTA). Users can download their messages from servers with standard protocols such as the POP or IMAP protocols, or using a proprietary protocol specific to Lotus Notes (Lotus Notes is a registered trademark of International Business Machines), as one example. EMail can be stored on the client, on the server side, or in both places.

In a typical email exchange, several steps may take place in order to have an email exchange. For example, the user may select an address from an address book, compose an email and then send the email to the recipient. Once the email is sent, the MUA (Mail User Application) formats the message in a usable format such as, for example, Internet email format and uses the SMTP to send the message to the local MTA. The MTA looks at the destination address provided in the SMTP protocol and the domain name to find the mail exchange servers accepting messages for that domain. The appropriate DNS server responds with a record listing the mail exchange servers for that domain. The message is then sent and stored on the selected mail exchange server. This is typically referred to as point-to-point email. The recipient can then retrieve the email.

In point-to-point emails, the recipient receives the email directly from his or her mail server. Problematic, though, is that the recipient can receive hundreds of emails in the course of a day of over another time period. This can add up to thousands of emails over a course of a week or longer. As such, it becomes very difficult to organize these emails and determine their importance and/or priorities.

SUMMARY

In a first aspect of the invention, a computing system includes first program instructions to generate tag clouds having tags linked to associated emails in a collaborative application. A computer readable media stores the first program instructions and a central processing unit executes the first program instructions.

In another aspect of the invention, a method for generating tag clouds for emails is stored in a central location and accessible to a collaborative community. The method comprises providing a computer infrastructure operable to generate the tag clouds from one or more descriptors provided by authorized users having access to a select group of the emails, the descriptors being associated with tags that are linked to the emails.

In another aspect of the invention, a computer program product is provided for protecting web applications from malicious attacks. The computer program product comprises: a computer readable medium; first program instructions to provide authorization to selected users to review emails in a central location; second program instructions to generate tags from descriptive words describing content in the emails and place the tags into the tag clouds; third program instructions to hyperlink the tags to selected ones of the emails; and fourth program instructions to filter the tag clouds. The first, second, third and fourth program instructions are stored on the computer readable media and executed on a central processing unit.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
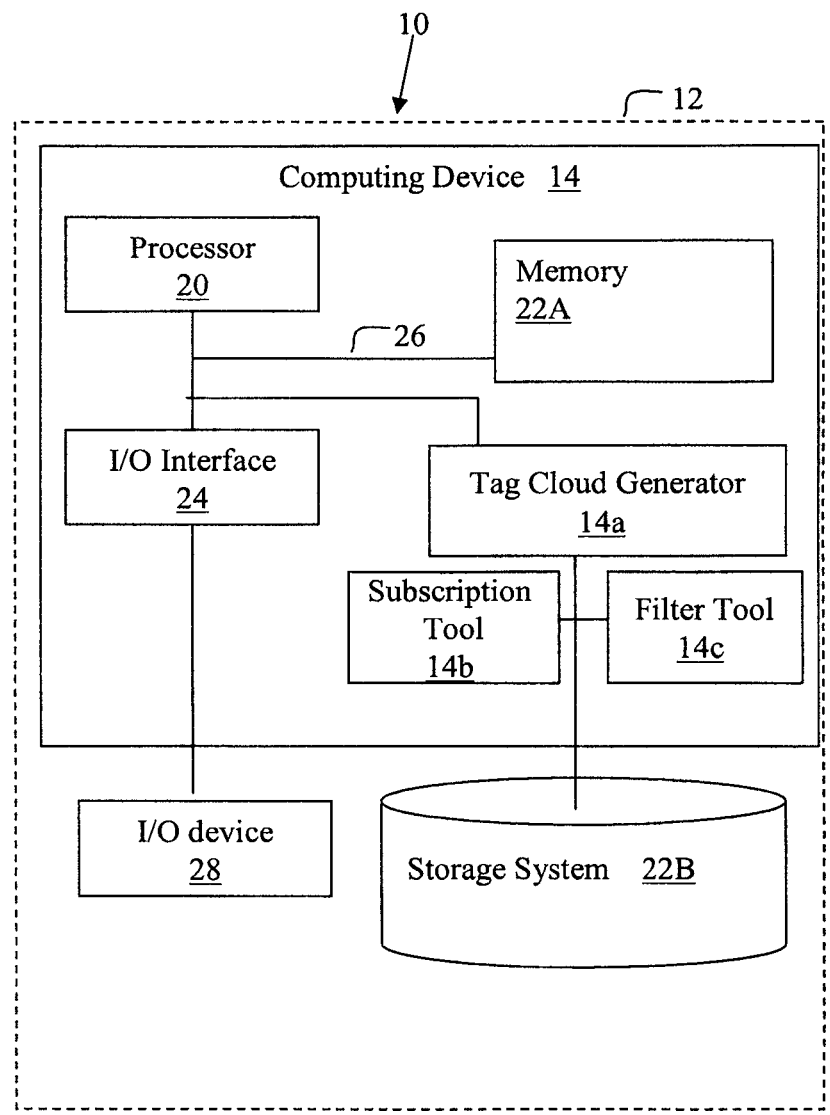
FIG. 1 shows an illustrative environment for implementing the steps in accordance with the invention.

The invention generally relates to a system and method of tracking and/or organizing email and, in particular, a system and method for tagging email in Web 2.0 applications and using the tags in tag clouds. The invention is particularly well-suited to organize emails and determine their importance and/or priorities using tag clouds. This can be accomplished within a collaborative environment such as, for example, in Web 2.0 applications.

More specifically, in embodiments, email will be sent to a central location, which features a subscription model (compared to a point to point email system). The subscription model enables the email sender, email recipient and/or administrator of the Web 2.0 collaborative email site to select the authorized users. The authorized users may, in turn, tag the emails with such descriptive words which are then converted into tags within tag clouds. In implementation, the tag clouds will allow users the ability to easily find relevant emails and, as importantly, navigate and filter emails, amongst hundreds and even thousands or more of emails.

Those of skill in the art will recognize that Web 2.0 is a term to describe World Wide Web technology aimed at information sharing and collaboration. These concepts have led web-based communities such as wikis, blogs and other social networking sites that encourage user participation. Also, a tag cloud is a stylized way of visually representing occurrences of words used to describe tags, where a tag is an html-encoded link that can be accessed using any number of web browsing applications.

In embodiments, the tag cloud is generated in real-time, and the appearance of one or more words within the tag cloud may change each time a user tags an email with a descriptive word. Once a tag cloud is created from the user assigned words, a user may select a word from the tag cloud, wherein the word is hyperlinked or otherwise connected to one or more relevant emails. The user can then select the most appropriate email, from the list of emails.

EXEMPLARY SYSTEM ENVIRONMENT AND INFRASTRUCTURE

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:
 a portable computer diskette,
 a hard disk,
 a random access memory (RAM),
 a read-only memory (ROM),
 an erasable programmable read-only memory (EPROM or Flash memory),
 a portable compact disc read-only memory (CDROM),
 an optical storage device, and/or
The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. The present invention can be used on a virtual instance of a computer (virtual machine), like VMWARE or XEN.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++, AJAX, JSON (e.g., to present a tag cloud on the email client) or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. The computing system 12 can be implemented as a Web 2.0 server, which allows for collaboration amongst users. The server 12 includes a computing device 14. The computing device 14 can be resident on a network infrastructure or computing device of a third party service provider (any of which is generally represented in FIG. 1) such as a Web 2.0 server.

The computing device 14 includes a Tag Cloud Generator (module or program code) 14a configured to make computing device 14 operable to perform the services described herein. The Tag Cloud Generator 14a can be implemented as one or more program codes stored in memory 22A, as separate or combined modules. In an illustrative example, the Tag Cloud Generator 14 is configured to generate tag clouds for tagging emails in Web 2.0 applications.

More specifically, the Tag Cloud Generator 14a can generate a tag cloud having one or more user assigned words (or other descriptors, symbols, letters numbers, etc.) within the tag cloud, wherein the user assigned words may be visually distinguishable from one another and connected to the emails, e.g., via a hyperlink. By using the tag clouds, users have the ability to easily find relevant emails and, as importantly, easily navigate and filter emails by simply selecting a term or terms in the tag cloud. The Tag Cloud Generator 14a also allows the authorized users to add go, delete from, and/or otherwise edit the tag cloud.

The Tag Cloud Generator 14a can score or weight the words assigned by the users. The score/weight is representative of how important or popular a user assigned word is within the collaborative website. Any number of factors may be considered when scoring/weighing the words, such as the number of times the word is associated with one or more emails, associated with a certain topic, etc.

In embodiments, an interface (FIGS. 2 and 3) to the Tag Cloud Generator 14a can present the tag cloud with words (tags) to the user, with the most used or highest scored or weighted words being shown in larger or bolder text, for example. More specifically, the tag cloud displays the user assigned words differently within the tag cloud based on their importance or popularity within the online community. For example, embodiments may change the size, color, font, location, etc., of a word to indicate to a user the usage of a word in a plurality of emails. Hence, a user presented with a word in red Arial 24 point bold font can infer the word is associated with more emails than a word presented in black Times New Roman 12 point font. Each of the words in the tag cloud may be hyperlinked, or otherwise connected, to the associated emails for display on the user's computing device.

The Tag Cloud Generator 14a features or is associated with a subscription tool 14b that enables the email sender, email recipient and/or administrator of the Web 2.0 collaborative email site (infrastructure of FIG. 1) to select authorized users. These authorized users will have the ability to tag emails within the collaborative site in order to show, visually, words that have been or are associated with emails. In the case of the email sender, the email can include a tag window (shown in FIGS. 2 and 3) which allows the email sender to provide a descriptive word or words, describing the content of the email at the time of sending of the email. These tag windows can also be displayed to the other authorized users. The Tag Cloud Generator 14*a* will use the words or other descriptors to generate a tag cloud.

As to the authorized users, including the email sender, each may have access to review the emails and tag them with descriptive words or descriptors to generate the tag clouds. As such, this community of authorized users can tag emails so that the tags can be visually displayed in the tag cloud. In embodiments, the tag cloud is generated in real-time using the Tag Cloud Generator 14*a*. That is, as the authorized email sender, email recipient and/or administrator can provide descriptive word or words which can be immediately included in the tag cloud. Once a tag cloud is created, a recipient (sender or other authorized user) may select a word from the tag cloud, which is hyperlinked or otherwise connected to one or more relevant emails.

The Tag Cloud Generator 14*a* also features or is associated with a filtering tool 14*c*. The filtering tool 14*c* allows an email user to filter the words to include, for example, more or less words in the tag cloud. The filter tool 14*c* can also be configured to highlight words that are above a certain threshold or have other user configurations that enable the email recipient to easily organize certain emails. The filtering tool 14*c* may also filter based on authorized users. For example, the email recipient can filter the tag cloud to include tags provided by only the most trusted users or those users known to have the most knowledge in a certain field that is germane to the email recipient's current search and/or needs.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, the handheld device.

In general, the processor 20 executes computer program code such as the DNS Request Validation Service Tool 14*a*, which can be stored in the memory 22A and/or storage system 22B. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. In this case, the service provider can create, maintain, deploy, support, etc., the computer infrastructure that performs the process steps of the invention for one or more customers. These customers may be, for example, any third party computing system. In return, the service provider can receive payment from the customer(s) under a subscription and/or fee agreement and/or the service provider can receive payment from the sale of advertising content to one or more third parties.

EXEMPLARY PROCESSES

Figure 2:
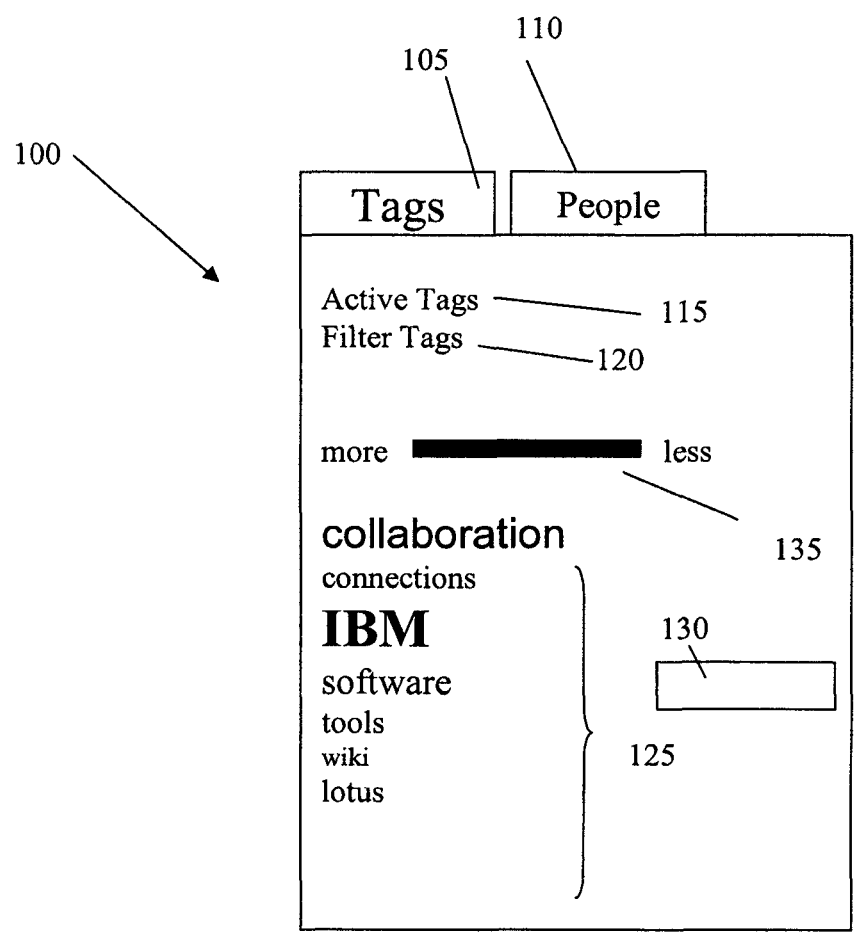
FIG. 2 shows an interface for a tag cloud generator in accordance with an aspect of the invention.

FIG. 2 illustrates an embodiment of an interface for a Tag Cloud Generator according to an aspect of the invention. As discussed above, a tag cloud is a stylized way of visually representing occurrences of words used to describe tags. A tag is an html-encoded link that can be accessed using any number of web browsing applications. Therefore, a tag cloud is a way to graphically show content of email by presenting graphical linkable words to a user, whereby the linking may be done via hyperlink or other mechanism. The words within the tag cloud are configured to emphasize the relative importance or popularity of the user assigned words within an online community (email).

Specifically. FIG. 2 illustrates an embodiment of an interface for a Tag Cloud Generator and its representative features. For example, the interface can include a tag tab 105 and a people tag 110 (discussed with reference to FIG. 3). The tag tab 105 directs the user to the tag cloud 100 and its related functions. These functions can include, for example, a list of active tags 115 and filtered tag function 120. The active tags 115 are those words shown representatively at reference numeral 125. The active tags 115 can be entered by the user directly into the tag cloud at location 130.

In FIG. 2, the words are of different fonts, sizes and shapes, indicating a weight or usage give to the words (or other descriptors), e.g., how many times the community has used the word to describe one or more emails. In this non-limiting illustrative example, the tag cloud graphically shows the more popular words in larger type. Therefore, the most used word in FIG. 2 is "IBM" and the least used word is "wiki" to describe the content of the emails. In this example, the user can easily identify emails that contain content associated with IBM such as, for example, product lists, services, etc.

By the user selecting "IBM" in the tag cloud, all emails associated with IBM will be displayed to the user, as the word "IBM" has been linked to such emails by the Tag Cloud Generator. That is, the words appearing in the tag cloud may be hyperlinked or otherwise connected to a list of relevant emails, whereby a user can click on a word appearing in the tag cloud and be directed to one or more relevant emails.

It should be understood that other schemes can also be used such as, for example, color, font type, etc. to determine the importance of a word. For example, in addition to changing the size, color, font, etc., of a word in a tag cloud, embodiments may also change the location of words within a tag cloud to illustrate the importance of one or more words within the tag cloud.

The filter tag 120 (associated with the filter tool 14b) may be used by the user to filter words such as, for example, connections, etc. This will allow the user to view only certain words above a threshold. For example, the word "connections" can be filtered, e.g., removed, from the tag cloud if it was used less than two times, i.e., below a threshold. In embodiments, the filter tag 120 can include a search box, for the user to search for certain words that may be associated with content of emails. The filter tag may be controlled by a metering system 135. The filter can be configured to highlight words that are above a certain threshold or have other user configurations that enable the email recipient to easily organize certain emails.

Figure 3:
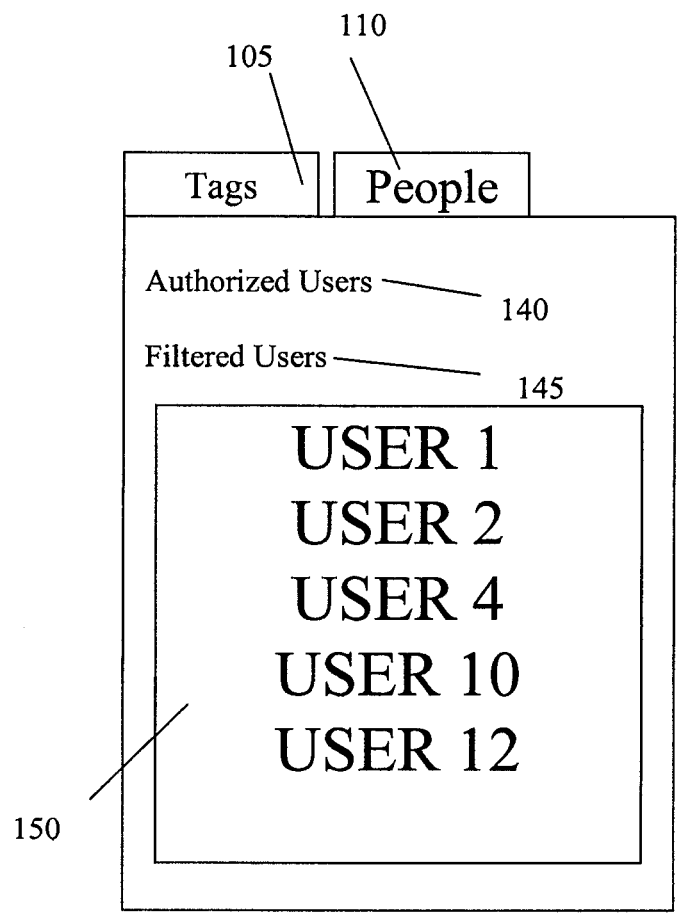
FIG. 3 shows another interface for a tag cloud generator in accordance with an aspect of the invention.

FIG. 3 shows the people tag 110 screen in accordance with an aspect of the invention. By selecting the people tag 110, the user can select authorized users 140 as well as filter certain users 145 (associated with the filter tool 14b and subscription tool 14c). This screen also shows the current users at reference numeral 150.

PROCESSES IN ACCORDANCE WITH THE INVENTION

FIGS. 4-7 are flow diagrams showing processes performed by Tag Cloud Generator program 14a (stored in disk storage 22B for execution by processor 20 via memory 22a) in accordance with different aspects of the invention. The steps of FIGS. 4-7 may be implemented on the computer infrastructure of FIG. 1, for example. The flowcharts and/or block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. Each block of the flowcharts, and combinations of the flowchart illustrations can be implemented by special purpose hardware-based systems that perform the specified functions or acts, or combinations of special purpose hardware and computer instructions and/or software, as described above.

Figure 4:
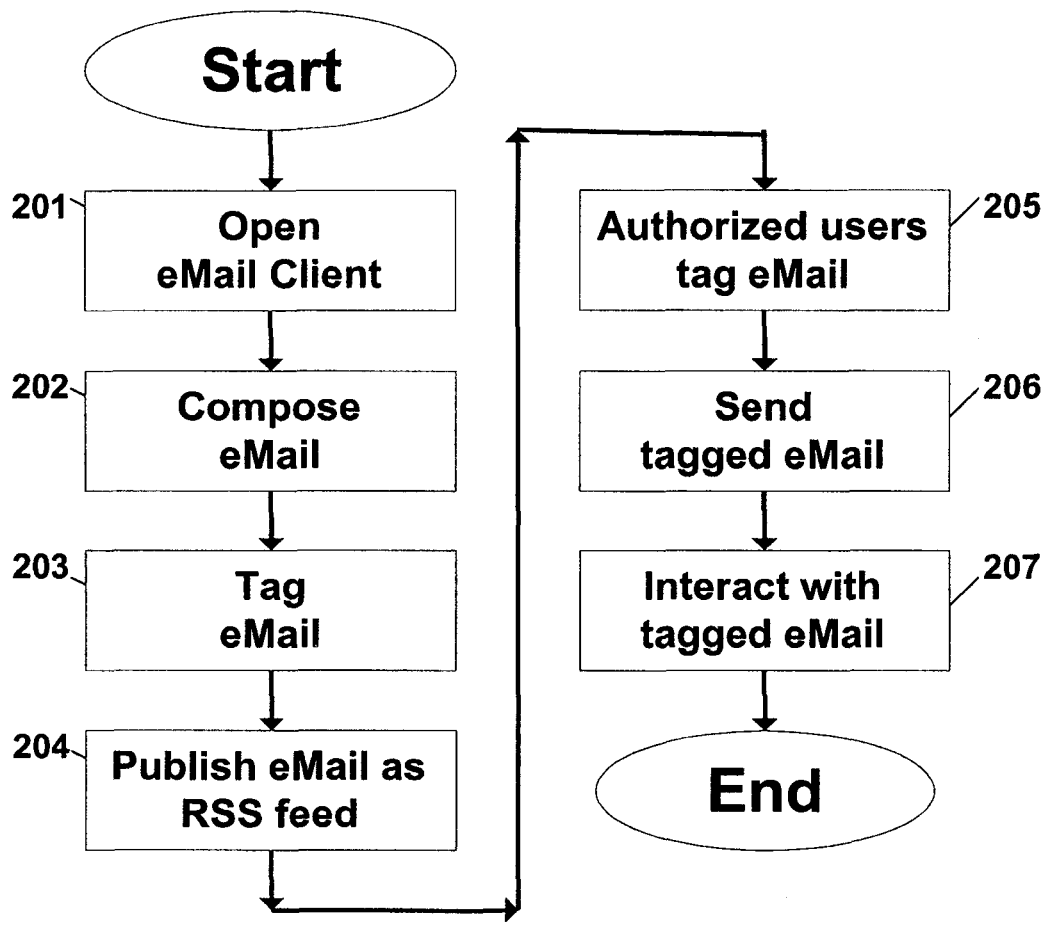
FIGS. 4-7 are flow diagrams showing processes in accordance with different aspects of the invention.

Referring to FIG. 4, at step 201, a user starts the email client. At step 202, the email is composed on the email client. In an optional embodiment, at step 203, the sender can choose to tag the email at the stage. The tagging is accomplished with the aid of the Tag Cloud Generator 14a. In embodiments, the email sender can provide descriptive word or words which can be immediately included in the tag cloud. Once a tag cloud is created, a recipient (sender or other authorized user) may select a word from the tag cloud, which is hyperlinked or otherwise connected to one or more relevant emails.

At step 204, the email gets published on the RSS server as an RSS feed document. At step 205, authorized uses can add additional tags to the email with the aid of the Tag Cloud Generator 14a. That is, as the authorized user can provide descriptive word or words which can be immediately included in the tag cloud. At step 206, an RSS feed to the email RSS document is sent to the recipients, at which time the recipient can interact with the tagged email at step 207. Some of the iterations include search emails by a keyword used during tagging. Search emails by a name used as a tag or even add additional tags for later retrieval and/or social interaction with additional users.

Figure 5:
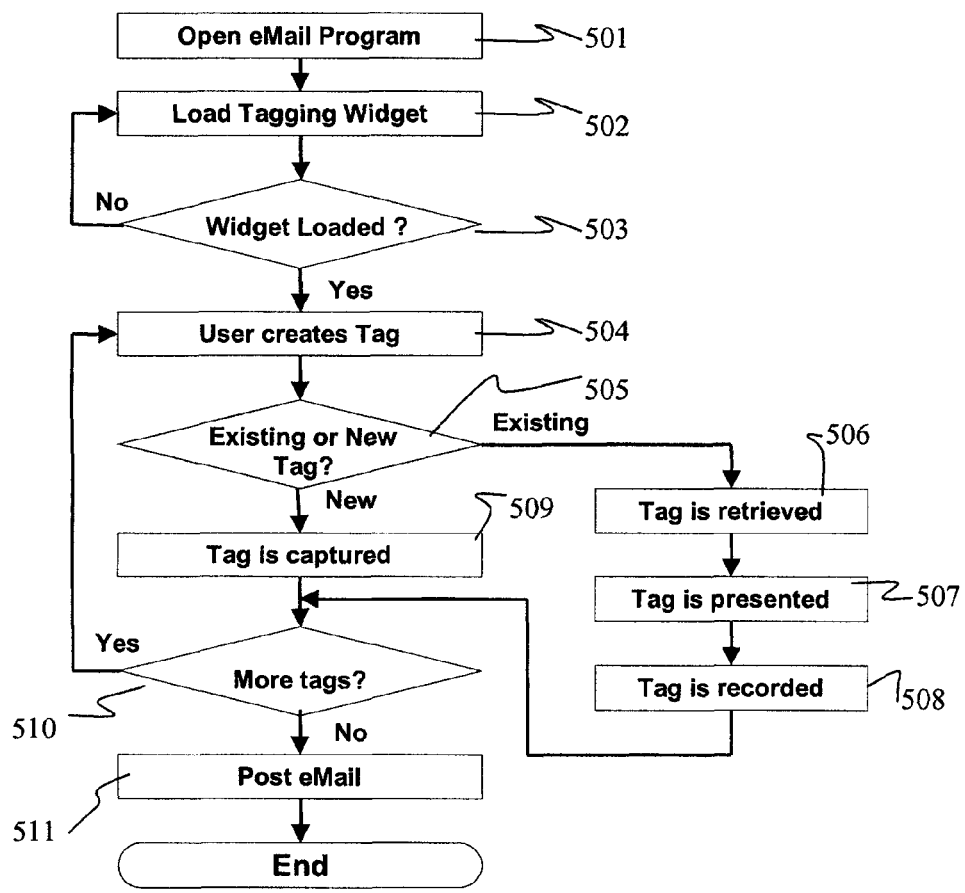

FIG. 5 shows a new email use case in accordance with aspects of the invention. In particular, at step 501, the user starts an email program. At step 502, the tagging widget (e.g., Tag Cloud Generator) is loaded during the email program initialization routine. At step 503, the program control determines whether the tagging widget is loaded. If not, the process reverts back to step 502.

If the tagging widget is loaded, at step 504, the user creates a new tag. At step 505, the tagging widget determines whether the tag is a new tag or an existing tag. This can be done by a look up to a database. If the tag is an existing tag, at step 506, the tagging widget retrieves the tag and, at step 507, presents the tag to the user. At step 508, the tagging widget records use of the tag. If the tag is a new tag, at step 509, the tagging widget captures the tag. At step 510, the tagging widget determines whether there are any additional tags. If not, at step 511, the email is posted as an RSS document to the RSS server. If there are any additional tags, the process reverts back to step 505.

Figure 6:
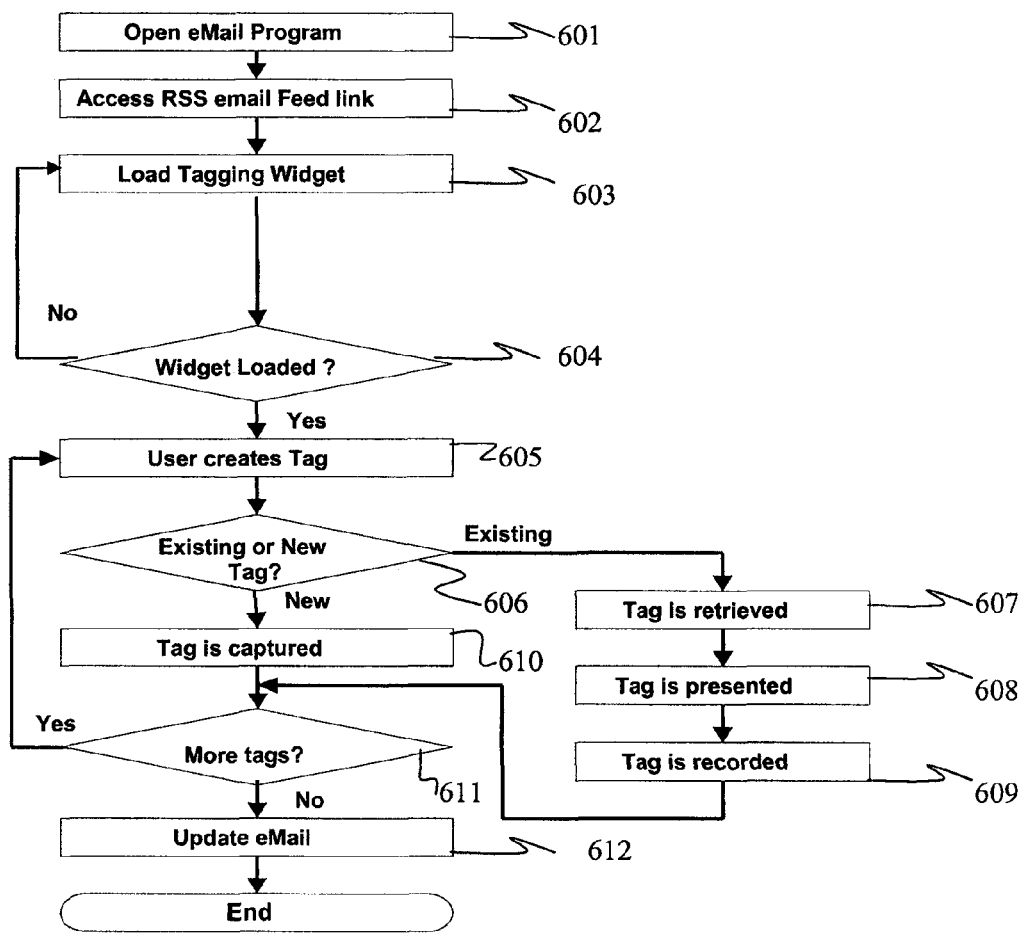

FIG. 6 shows an RSS feed reader use case in accordance with aspects of the invention. In particular, at step 601, the user opens an email program. At step 602, the program control provides access to an RSS email feed link. At step 603, a tagging widget (e.g., Tag Cloud Generator) is loaded during the email program initialization routine. At step 604, the program control determines whether the tagging widget is loaded. If not, the process reverts back to step 603.

If the tagging widget is loaded, at step 605, the user creates a new tag. At step 606, the tagging widget determines whether the tag is a new tag or an existing tag. In embodiments, the program control checks with a Back End (BE) component for the creation state of the tag. If the BE component returns an 'existing' state flag, the program control retrieves the tag from the BE component, at step 607. At step 608, the tagging widget presents the tag to the user. At step 609, the tagging widget captures the user decision and records use of the tag. Also, if the tag is an existing tag as determined at step 606, at step 610, the tagging widget captures the tag. At step 611, the tagging widget determines if there are any additional tags. If yes, then the process returns to step 605. If not, the tagging widget updates the email as an RSS document to the RSS server.

Figure 7:
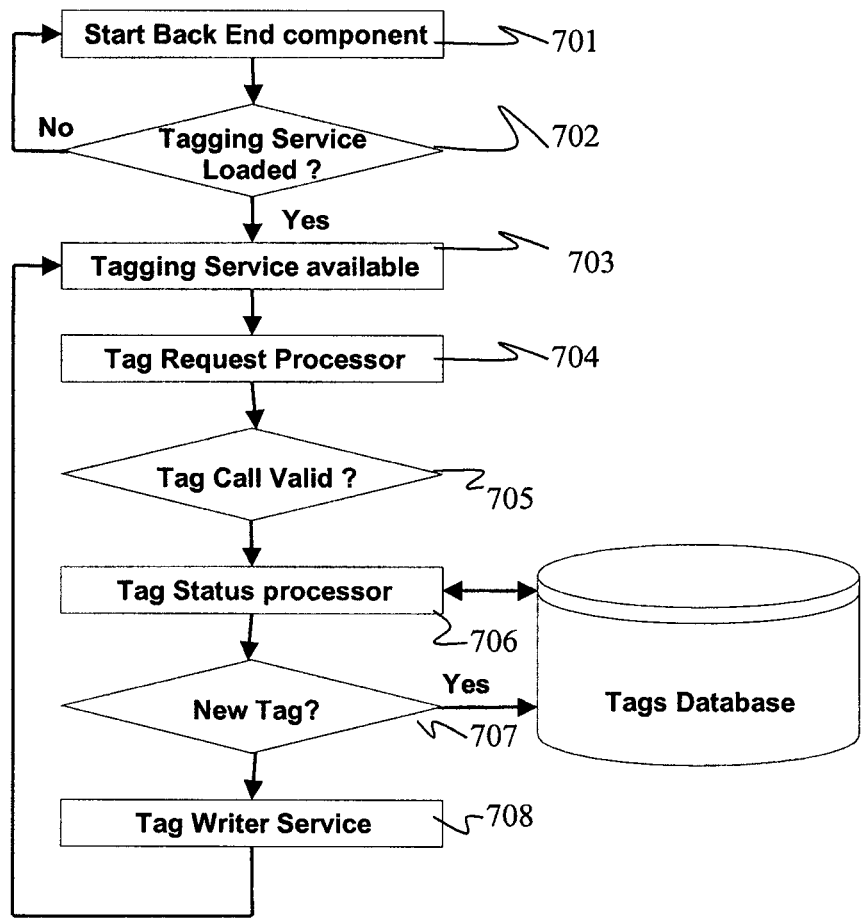

FIG. 7 shows a back end tagging system process in accordance with aspects of the invention. At step 701, the Back End (BE) tagging system is started by the system administrator. At step 702, the program control checks for the tagging service availability. If loaded successfully, at step 703, the tagging request handler (tagging widget) is ready to accept RESTful service call for tags. At step 704, a call is made to the a Tag Request processor component. At step 705, the program control checks for the validity of the Web Service tagging request. If the tag request call is valid, at step 706, a query is made to the database to establish the state of the tag. The options may include, for example, a new tag, not available on the database or existing tag, tag has been used before, etc. A response is sent to a Front End (FE) component of the tagging widget with the creation state of the tag. At step 707, if there is a new tag, the tagging widget will send the new tag to the database. At step 708, tag writer service component of the tagging widget captures the tag selected by the users. The process then returns to step 703 for the next query.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer system for accessing an e-mail, the computer system comprising:
    one or more processors, one or more computer-readable memories, one or more computer-readable tangible storage devices, and program instructions stored on at least one of the one or more storage devices for execution by at least one of the one or more processors via at least one of the one or more memories, the program instructions comprising:
    program instructions to receive the e-mail at a web site from a sender of the e-mail for posting, and post the e-mail at the web site for retrieval by one or more addressees specified in the e-mail;
    program instructions to (a) receive at the web site, from the one or more addressees, specification of one or more descriptive tags for the e-mail and correlate the one or more descriptive tags to the e-mail, and (b) prevent correlation to the e-mail of a descriptive tag from a person who is not the sender of the e-mail, not an addressee of the e-mail and not an administrator of the web site;
    program instructions to receive from one of the addressees a subsequent key word search for the one or more descriptive tags;
    program instructions, responsive to the subsequent key word search being received from one of the addressees and matching the one or more descriptive tags and the correlation of the one or more descriptive tags to the e-mail, to identify the e-mail to the one addressee; and
    program instructions, responsive to identification by the sender or the one or more addressees of another person, who is not the sender of the e-mail, not an addressee of the e-mail and not an administrator of the web site, as authorized to post a descriptive tag for the e-mail, to receive at the web site, from the other person, specification of another descriptive tag for the email and correlate the other descriptive tag to the e-mail such that a subsequent key word search for the other descriptive tag will yield the e-mail.

2. The system of claim 1, wherein the one or more descriptive tags for the e-mail received at the web site from the one or more addressees describe content of the e-mail.

3. The computer system of claim 1, wherein the web site is an RSS feed site and further comprising program instructions, stored on at least one of the one or more storage devices for execution by at least one of the one or more processors via at least one of the one or more memories, responsive to the posting of the e-mail on the web site, to notify the one or more addressees that an e-mail addressed to the one or more addressees has been posted on the web site.

4. The computer system of claim 1, wherein the program instructions to identify the e-mail include program instructions to prevent identification of the e-mail to another person who is not the sender of the e-mail, not an addressee of the e-mail and not an administrator of the web site regardless of whether the other person requests a key word search for the one or more descriptive tags.

5. The computer system of claim 1, further comprising program instructions, stored on at least one of the one or more storage devices for execution by at least one of the one or more processors via at least one of the one or more memories, to forward the identified e-mail to the one addressee from whom the key word search was received.

6. The computer system of claim 1, wherein the program instructions to receive and correlate one or more the descriptive tags include program instructions to (a) receive at the web site, from the sender of the e-mail along with the e-mail, specification of one or more descriptive tags for the e-mail and correlate to the e-mail the one or more descriptive tags received from the sender along with the one or more descriptive tags received from the one or more addressees; and further comprising:
    program instructions, stored on at least one of the one or more storage devices for execution by at least one of the one or more processors via at least one of the one or more memories, to receive from another of the addressees a subsequent key word search for the one or more descriptive tags received from the one or more addressees or the sender; and
    program instructions, stored on at least one of the one or more storage devices for execution by at least one of the one or more processors via at least one of the one or more memories, responsive to the subsequent key word search being received from one of the addressees and matching the one or more descriptive tags received from the one or more addressees or the sender and the correlation to the e-mail of the one or more descriptive tags received from the one or more addressees or the sender, to identify the e-mail to the other addressee.

7. The computer system of claim 6, further comprising program instructions, stored on at least one of the one or more storage devices for execution by at least one of the one or more processors via at least one of the one or more memories, to forward to the other addressee the e-mail identified in response to the key word search received from the other addressee.

8. The computer system of claim 1, further comprising program instructions, stored on at least one of the one or more storage devices for execution by at least one of the one or more processors via at least one of the one or more memories, to display the one or more descriptive tags in a tag cloud associated with the e-mail.

9. The computer system of claim 1, further comprising program instructions, stored on at least one of the one or more storage devices for execution by at least one of the one or more processors via at least one of the one or more memories, to receive from another of the addressees a request to delete a specified descriptive tag, and in response, to delete the correlation to the e-mail of the specified descriptive tag, such that if one of the addressees subsequently submits a key word search for the specified descriptive tag, the e-mail will not be identified to the addressee which submitted the key word search for the specified descriptive tag.

10. The computer system of claim 1, further comprising:
program instructions, stored on at least one of the one or more storage devices for execution by at least one of the one or more processors via at least one of the one or more memories, to receive from the one or more addressees identification of another person, who is not the sender of the e-mail, not an addressee of the e-mail and not an administrator of the web site, to be authorized to submit descriptive tags for the e-mail; and wherein
the program instructions to receive and correlate one ore more the descriptive tags include program instructions to (a) receive at the web site, from the other person, the specification of one or more descriptive tags for the e-mail and correlate to the e-mail the one or more descriptive tags received from the other person along with the one or more descriptive tags received from the one or more addressees; and further comprising:
program instructions, stored on at least one of the one or more storage devices for execution by at least one of the one or more processors via at least one of the one or more memories, to receive from one of the addressees a subsequent key word search for the one or more descriptive tags received from the other person; and
program instructions, stored on at least one of the one or more storage devices for execution by at least one of the one or more processors via at least one of the one or more memories, responsive to the subsequent key word search being received from one of the addressees and matching the one or more descriptive tags subsequently received from the other person and the correlation to the e-mail of the one or more descriptive tags received from the other person, to identify the e-mail to the one addressee who submitted the subsequent key word search.

11. A computer program product for accessing an e-mail, the computer program product comprising:
one or more computer-readable tangible storage devices and program instructions stored on at least one of the one or more storage devices, the program instructions comprising:
program instructions to receive the e-mail at a web site from a sender of the e-mail for posting, and post the e-mail at the web site for retrieval by one or more addressees specified in the e-mail;
program instructions to (a) receive at the web site, from the one or more addressees, specification of one or more descriptive tags for the e-mail and correlate the one or more descriptive tags to the e-mail, and (b) prevent correlation to the e-mail of a descriptive tag from a person who is not the sender of the e-mail, not an addressee of the e-mail and not an administrator of the web site;
program instructions to receive from one of the addressees a subsequent key word search for the one or more descriptive tags;
program instructions, responsive to the subsequent key word search being received from one of the addressees and matching the one or more descriptive tags and the correlation of the one or more descriptive tags to the e-mail, to identify the e-mail to the one addressee;and
program instructions, responsive to identification by the sender or the one or more addressees of another person, who is not the sender of the e-mail, not an addressee of the e-mail and not an administrator of the web site, as authorized to post a descriptive tag for the e-mail, to receive at the web site, from the other person, specification of another descriptive tao for the email and correlate the other descriptive tag to the e-mail such that a subsequent key word search for the other descriptive tag will yield the e-mail.

12. The computer program product of claim 11, wherein the one or more descriptive tags for the e-mail received at the web site from the one or more addressees describe content of the e-mail.

13. The computer program product of claim 11, wherein the web site is an RSS feed site, and further comprising program instructions, stored on at least one of the one or more storage devices, responsive to the posting of the e-mail on the web site, to notify the one or more addressees that an e-mail addressed to the one or more addressees has been posted on the web site.

14. The computer program product of claim 11, wherein the program instructions to identify the e-mail include program instructions to prevent identification of the e-mail to another person who is not the sender of the e-mail, not an addressee of the e-mail and not an administrator of the web site regardless of whether the other person requests a key word search for the one or more descriptive tags.

15. The computer program product of claim 12, further comprising program instructions, stored on at least one of the one or more storage devices, to forward the identified e-mail to the one addressee from whom the key word search was received.

16. The computer program product of claim 11, wherein the program instructions to receive and correlate one or more the descriptive tags include program instructions to (a) receive at the web site, from the sender of the e-mail along with the e-mail, specification of one or more descriptive tags for the e-mail and correlate to the e-mail the one or more descriptive tags received from the sender along with the one or more descriptive tags received from the one or more addressees; and further comprising:
program instructions, stored on at least one of the one or more storage devices, to receive from another of the addressees a subsequent key word search for the one or more descriptive tags received from the one or more addressees or the sender; and
program instructions, stored on at least one of the one or more storage devices, responsive to the subsequent key word search being received from one of the addressees and matching the one or more descriptive tags received from the one or more addressees or the sender and the correlation to the e-mail of the one or more descriptive tags received from the one or more addressees or the sender, to identify the e-mail to the other addressee.

17. The computer program product of claim 16, further comprising program instructions, stored on at least one of the one or more storage devices, to forward to the other addressee the e-mail identified in response to the key word search received from the other addressee.

18. The computer program product of claim 11, further comprising program instructions, stored on at least one of the one or more storage devices, to display the one or more descriptive tags in a tag cloud associated with the e-mail.

19. The computer program product of claim 11, further comprising program instructions, stored on at least one of the one or more storage devices, to receive from another of the addressees a request to delete a specified descriptive tag, and in response, to delete the correlation to the e-mail of the specified descriptive tag, such that if one of the addressees subsequently submits a key word search for the specified descriptive tag, the e-mail will not be identified to the addressee which submitted the key word search for the specified descriptive tag.

20. The computer program product of claim 11, further comprising:
   program instructions, stored on at least one of the one or more storage, to receive from the one or more addressees identification of another person, who is not the sender of the e-mail, not an addressee of the e-mail and not an administrator of the web site, to be authorized to submit descriptive tags for the e-mail; and wherein
   the program instructions to receive and correlate one or more the descriptive tags include program instructions to (a) receive at the web site, from the other person, specification of the one or more descriptive tags for the e-mail and correlate to the e-mail the one or more descriptive tags received from the other person along with the one or more descriptive tags received from the one or more addressees; and further comprising:
   program instructions, stored on at least one of the one or more storage devices, to receive from one of the addressees a subsequent key word search for the one or more descriptive tags received from the other person; and
   program instructions, stored on at least one of the one or more storage devices, responsive to the subsequent key word search being received from one of the addressees and matching the one or more descriptive tags subsequently received from the other person and the correlation to the e-mail of the one or more descriptive tags received from the other person, to identify the e-mail to the one addressee who submitted the subsequent key word search.

* * * * *